United States Patent
Achten

(10) Patent No.: US 11,067,067 B2
(45) Date of Patent: Jul. 20, 2021

(54) HYDRAULIC DEVICE

(71) Applicant: INNAS BV, Breda (NL)

(72) Inventor: Peter Augustinus Johannes Achten, Eindhoven (NL)

(73) Assignee: INNAS BV, Breda (NL)

(*) Notice: Subject to any disclaimer, the term of this patent is extended or adjusted under 35 U.S.C. 154(b) by 0 days.

(21) Appl. No.: 16/099,369

(22) PCT Filed: May 17, 2017

(86) PCT No.: PCT/EP2017/061853
§ 371 (c)(1),
(2) Date: Nov. 6, 2018

(87) PCT Pub. No.: WO2017/198720
PCT Pub. Date: Nov. 23, 2017

(65) Prior Publication Data
US 2019/0226464 A1 Jul. 25, 2019

(30) Foreign Application Priority Data
May 19, 2016 (EP) .................... 16170434

(51) Int. Cl.
*F04B 1/24* (2006.01)
*F04B 53/00* (2006.01)
(Continued)

(52) U.S. Cl.
CPC .............. *F04B 1/24* (2013.01); *F01B 3/0085* (2013.01); *F04B 1/124* (2013.01); *F04B 53/008* (2013.01);
(Continued)

(58) Field of Classification Search
CPC .......... F01B 3/0085; F04B 1/124; F04B 1/24; F04B 53/14; F04B 53/144; F16J 1/005; F16J 1/12
See application file for complete search history.

(56) References Cited

U.S. PATENT DOCUMENTS 3,057,668 A * 10/1962 Cornelius ............. F01B 3/0032
92/257
3,434,429 A 3/1969 Goodwin
(Continued)

FOREIGN PATENT DOCUMENTS

CN 101313148 A 11/2008
CN 101523052 A 9/2009
(Continued)

OTHER PUBLICATIONS

U.S. Appl. No. 16/099,366, filed Nov. 6, 2018.
(Continued)

*Primary Examiner* — F Daniel Lopez
*Assistant Examiner* — Matthew Wiblin
(74) *Attorney, Agent, or Firm* — Steven M. Koehler; Westman, Champlin & Koehler, P.A.

(57) ABSTRACT

A hydraulic device includes a shaft mounted in a housing rotatable about a first axis of rotation. The shaft has a flange extending perpendicularly to the first axis. A plurality of pistons is fixed to the flange. A plurality of cylindrical sleeves cooperates with the pistons to form respective compression chambers of variable volume. The cylindrical sleeves are rotatable about a second axis of rotation which intersects the first axis of rotation by an acute angle such that upon rotating the shaft the volumes of the compression chambers change. Each piston has a piston head including a circumferential wall of which the outer side is ball-shaped and the inner side surrounds a cavity. Each of the pistons is fixed to the flange by a piston pin having a piston pin head
(Continued)

including a circumferential outer side facing the inner side of the circumferential wall of the piston head.

13 Claims, 2 Drawing Sheets

(51) Int. Cl.
  *F04B 53/14* (2006.01)
  *F01B 3/00* (2006.01)
  *F16J 1/00* (2006.01)
  *F16J 1/12* (2006.01)
  *F04B 1/124* (2020.01)

(52) U.S. Cl.
  CPC ............ *F04B 53/14* (2013.01); *F04B 53/144* (2013.01); *F16J 1/005* (2013.01); *F16J 1/12* (2013.01)

(56) References Cited

U.S. PATENT DOCUMENTS

| | | | |
|---|---|---|---|
| 3,648,567 | A | 3/1972 | Clark |
| 3,948,111 | A | 4/1976 | Dittrich |
| 3,958,456 | A | 5/1976 | Jacobson |
| 4,223,594 | A | 9/1980 | Gherner |
| 4,361,077 | A | 11/1982 | Mills |
| 4,363,294 | A * | 12/1982 | Searle ............... F01B 15/00 123/193.6 |
| 4,703,682 | A | 11/1987 | Hansen |
| 4,776,257 | A | 10/1988 | Hansen |
| 5,249,506 | A * | 10/1993 | Willimczik ........... F01B 3/0032 417/462 |
| 5,304,043 | A * | 4/1994 | Shilling ............. F04B 27/0804 417/269 |
| 5,415,530 | A | 5/1995 | Shilling |
| 5,564,327 | A * | 10/1996 | Sims ..................... F16J 1/12 74/579 E |
| 5,636,561 | A * | 6/1997 | Pecorari ................ F04B 1/24 91/499 |
| 5,778,757 | A | 7/1998 | Kristensen et al. |
| 5,794,514 | A * | 8/1998 | Pecorari ................ F04B 1/124 417/269 |
| 5,960,697 | A | 10/1999 | Hayase et al. |
| 6,152,014 | A * | 11/2000 | Willimczik ........... F01B 3/0038 417/269 |
| 6,283,721 | B1 | 9/2001 | Gollner |
| 6,293,768 | B1 | 9/2001 | Shintoku et al. |
| 6,312,231 | B1 | 11/2001 | Kuhne et al. |
| 6,629,822 | B2 | 10/2003 | Larkin et al. |
| 6,663,354 | B2 | 12/2003 | Forster |
| 7,311,034 | B2 | 12/2007 | Achten |
| 7,328,647 | B2 | 2/2008 | Achten |
| 7,470,116 | B2 | 12/2008 | Dantlgraber |
| 7,731,485 | B2 | 6/2010 | Achten |
| 8,297,239 | B2 * | 10/2012 | Kwok ................. F01B 3/0041 123/43 A |
| 8,794,938 | B2 | 8/2014 | Frey |
| 2004/0173089 | A1 * | 9/2004 | Gray, Jr. .............. F04B 1/124 91/505 |
| 2005/0017573 | A1 | 1/2005 | Achten |
| 2005/0019171 | A1 | 1/2005 | Achten |
| 2005/0201879 | A1 | 9/2005 | Achten |
| 2006/0051223 | A1 | 3/2006 | Mark et al. |
| 2006/0120881 | A1 | 6/2006 | Dantlgraber |
| 2006/0222516 | A1 | 10/2006 | Achten |
| 2007/0251378 | A1 | 11/2007 | Nelson |
| 2009/0007773 | A1 | 1/2009 | Zhu |
| 2009/0084258 | A1 | 4/2009 | Stoelzer |
| 2009/0196768 | A1 | 8/2009 | Nelson et al. |
| 2009/0290996 | A1 | 11/2009 | Ishizaki |
| 2010/0119394 | A1 | 5/2010 | Frey |
| 2013/0195687 | A1 * | 8/2013 | Achten ................ F04B 1/306 417/222.1 |
| 2015/0361971 | A1 * | 12/2015 | Wood .................. F04B 39/0005 92/240 |
| 2017/0335820 | A1 * | 11/2017 | Pecorari .............. F04B 1/2014 |

FOREIGN PATENT DOCUMENTS

| | | |
|---|---|---|
| DE | 2130514 A1 | 12/1972 |
| DE | 3519783 A1 | 12/1986 |
| DE | 102006021570 A1 | 10/2007 |
| DE | 102008012404 A1 | 9/2009 |
| EP | 1508694 A1 | 2/2005 |
| EP | 1855002 A1 | 11/2007 |
| EP | 2012010 A1 | 1/2009 |
| GB | 2446348 A | 8/2008 |
| JP | 2005514552 A | 5/2005 |
| JP | 2005522631 A | 7/2005 |
| JP | 2009531590 A | 9/2009 |
| NL | 1019736 C1 | 7/2003 |
| NL | 1020932 C2 | 7/2003 |
| WO | 8600662 A1 | 1/1986 |
| WO | 2003058035 A1 | 7/2003 |
| WO | 2004055369 A1 | 7/2004 |
| WO | 2006083163 A1 | 8/2006 |
| WO | WO-2007079707 A1 * | 7/2007 .......... F15B 15/1447 |
| WO | 2007060822 A1 | 5/2009 |

OTHER PUBLICATIONS

U.S. Appl. No. 16/099,356, filed Nov. 6, 2018.
International Search Report, dated Oct. 19, 2017 for corresponding International Patent Application No. PCT/EP2017/061853, filed May 17, 2017.
Written Opinion of the International Searching Authority, dated Oct. 19, 2017 for corresponding International Patent Application No. PCT/EP2017/061853, filed May 17, 2017.
"Volumetric losses of a multi piston floating cup pump", Peter A.J. Achten; Proceedings of the National Conference on Fluid Power; 337-348; Proceedings of the 50th National conference on fluid power by National Fluid Power Association; 2005, NCFP I05-10.2.

* cited by examiner

HYDRAULIC DEVICE

CROSS-REFERENCE TO RELATED APPLICATION

The present application is a national stage of and claims priority of International patent application Serial No. PCT/EP2017/061853, filed May 17, 2017, and published in English as WO/2017/198720.

BACKGROUND

The present invention relates to a hydraulic device, in particular, a hydraulic device having a shaft mounted in a housing and rotatable about a first axis of rotation.

The shaft has a flange which extends perpendicularly to the first axis. Pistons are fixed to the flange at equiangular distance about the first axis of rotation. An equal number of cylindrical sleeves are supported by a barrel plate and rotate together with the barrel plate about the second axis of rotation which is angled with respect to the first axis of rotation. Each piston is sealed directly to the inner wall of the corresponding cylindrical sleeve, i.e. without using a piston ring. During rotation of the barrel plate the cylindrical sleeve makes a combined translating and swiveling motion around the piston. Therefore, the outer side of the circumferential wall of the piston heads are ball-shaped. It is noted that the ball-shape creates a sealing line between the piston and the cylindrical sleeve which extends perpendicularly to the center line of the cylindrical sleeve.

Due to internal pressure in the compression chamber the cylindrical sleeve deforms in radial direction under operating conditions. The cavity in the piston head forms part of the compression chamber and serves to deform the piston at the sealing line such that the piston expansion follows the piston sleeve expansion. Consequently, leakage flow between the piston and the cylindrical sleeve at the sealing line is minimized. In order to allow deformation of the piston head it has a thin-walled circumferential wall. The cavity is formed between a central cavity filling portion of the piston and the inner side of the circumferential wall. Due to the cavity filling portion the volume of the cavity at the inner side of the circumferential wall of the piston head is minimized. This means that the dead volume of the compression chamber is minimized, which has an advantageous effect on noise emission and hydraulic efficiency of the hydraulic device. A disadvantage is that manufacturing of the pistons is rather complicated.

SUMMARY

In a hydraulic device, which can be manufactured in a simple manner, each of the pistons is fixed to the flange by means of a piston pin extending through the piston and having a piston pin head including a circumferential outer side facing the inner side of the circumferential wall of the piston head.

An advantage of the invention is that the piston can be secured to the flange by means of the piston pin in a relatively easy way. Besides, the application of the piston pin provides the opportunity to influence the dead volume of the compression chamber by adjusting the shape and size of the piston pin head and the inner side of the circumferential wall to each other. It is noted that the piston and the piston pin are separate parts and together form a piston function in assembled condition.

A further benefit is achieved when the piston pin has a piston pin shank of which an end portion is clamped in the flange since this is a relatively simple manufacturing step.

In a specific embodiment the piston is locked to the flange in transverse direction of the piston pin, whereas play is present between the piston pin and the piston in transverse direction of the piston pin beyond the flange. This means that a torque and/or a lateral force onto the piston will be absorbed by the flange instead of the piston pin. This provides the possibility of applying piston pins including relatively narrow piston pin shanks requiring relatively narrow holes in the flange. Consequently, the flange can have a relatively small width compared to a conventional flange in which each of the pistons is mounted, since a portion of the piston to be mounted in the flange has a larger diameter than a piston pin shank which is mounted in the flange.

In practice, the flange may be provided with flange recesses in which end portions of the respective pistons are received so as to lock the pistons to the flange in transverse direction of the piston pins. The diameters of the recesses are larger than the respective holes in which the piston pins are received. Preferably, the end portions of the pistons rest on the bottoms of the respective recesses accurately and are free from play. In a practical embodiment there is play between the piston pin shank and the piston in transverse direction of the piston, which means that the piston pin shank extends through a through-hole of the piston and has a smaller diameter than that through-hole.

In an alternative embodiment the piston is locked to the piston pin in transverse direction of the piston pin at a locking location close to the flange, whereas play is present between the piston pin and the piston in transverse direction of the piston pin beyond the locking location as seen from the flange. This means that a torque and/or a lateral force onto the piston will be transferred to the flange by the piston pin, but due to the location of the locking location, the transfer of force from the piston to the piston pin occurs close to the flange. Therefore, a resulting torque or lateral force on the piston pin is limited. In this case the piston pin extends through a through-hole of the piston and has a smaller diameter than the through-hole outside the locking location. Preferably, the end portions of the pistons rest on the flange accurately and are free from play.

In a particular embodiment a slot-shaped cavity is present between the inner side of the circumferential wall and the outer side of the piston pin head. In this case a narrow slot at the piston head can be created by adjusting the shape and size of the piston pin head and the inner side of the circumferential wall to each other. This means that conventional complicated manufacturing steps onto a massive workpiece, such as accurately removing material from a workpiece at the intended slot, in order to create the slot-shaped cavity in the piston head can be omitted. Since the hydraulic device comprises a plurality of pistons the entire manufacturing effort is simplified.

In a practical embodiment the outer side of the piston pin head and the inner side of the circumferential wall of the piston head are parallel.

The piston pin head may partly project from the end of the piston head in order to minimize the dead volume.

BRIEF DESCRIPTION OF THE DRAWINGS

Aspects of the invention will hereafter be elucidated with reference to very schematic drawings showing embodiments of the invention by way of example.

DETAILED DESCRIPTION

Figure 1:
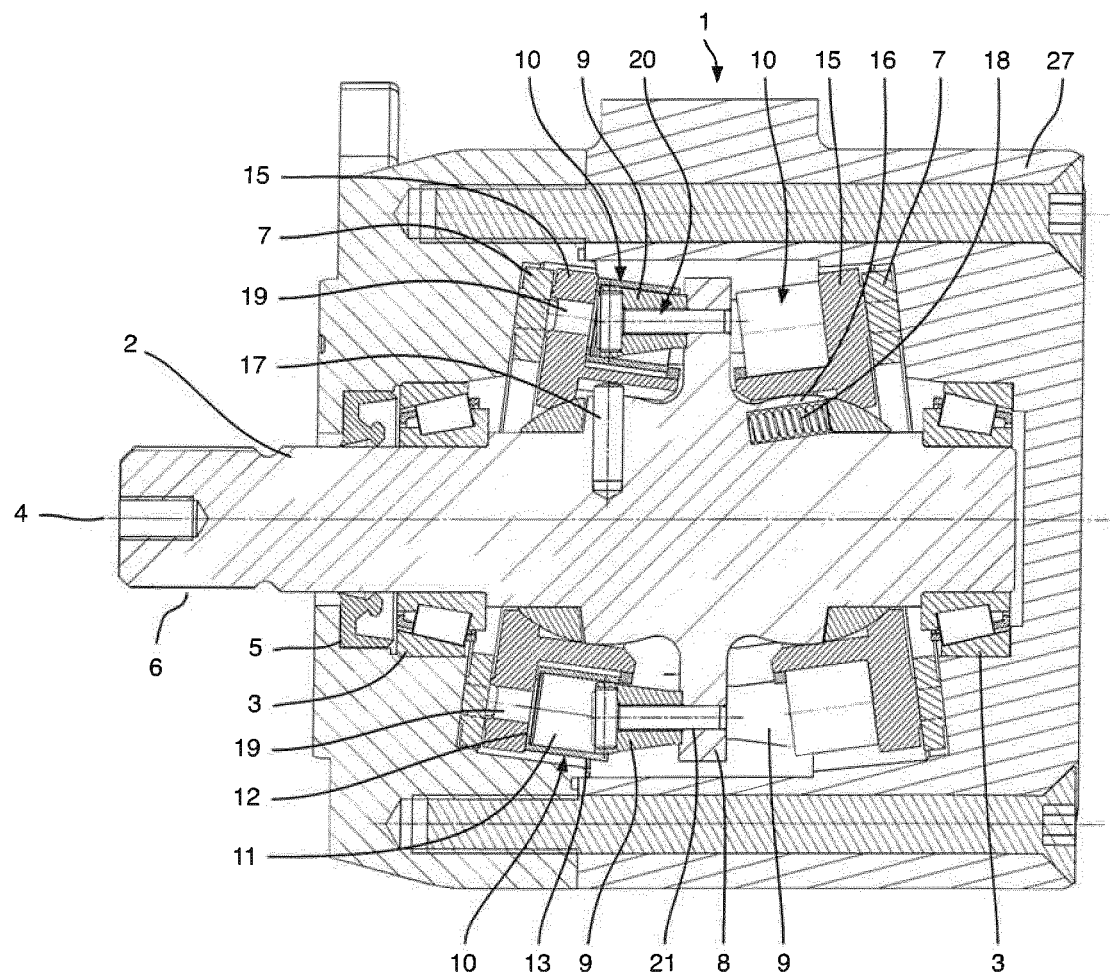
FIG. 1 is a cross-sectional view of an embodiment of a hydraulic device.

FIG. 1 shows internal parts of a hydraulic device 1, such as a pump or hydromotor, which are fitted into a housing 27 in a known manner. The hydraulic device 1 is provided with a shaft 2 which is supported by bearings 3 at both sides of the housing 27 and it is rotatable about a first axis of rotation 4. The housing 27 is provided on the one side with an opening with a shaft seal 5 in a known manner, as a result of which the end of the shaft 2, which is provided with a toothed shaft end 6, protrudes from the housing 27. A motor can be coupled to the toothed shaft end 6 if the hydraulic device 1 is a pump, and a driven tool can be coupled thereto if the hydraulic device 1 is a motor.

The hydraulic device 1 comprises face plates 7 which are mounted inside the housing 27 at a distance from each other. The face plates 7 have a fixed position with respect to the housing 27 in rotational direction thereof. The shaft 2 extends through central through-holes in the face plates 7.

The shaft 2 is provided with a flange 8 which extends perpendicularly to the first axis of rotation 4. A plurality of pistons 9 are fixed at both sides of the flange 8 at equiangular distance about the first axis of rotation 4, in this case fourteen pistons 9 on either side. The pistons 9 have center lines which extend parallel to the first axis of rotation 4. The planes of the face plates 7 are angled with respect to each other and with respect to the plane of the flange 8.

Figure 2:
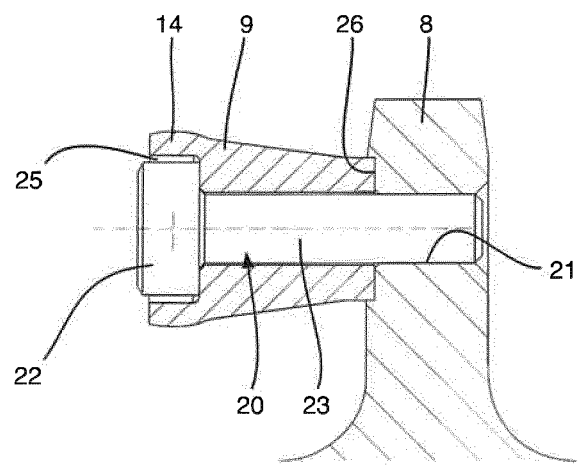
FIG. 2 is a cross-sectional view of a part of the embodiment of FIG. 1 on a larger scale.

Each of the pistons 9 cooperates with a cylindrical sleeve 10 to form a compression chamber 11 of variable volume. The hydraulic device 1 as shown in FIG. 1 has 28 compression chambers 11. The cylindrical sleeve 10 comprises a sleeve bottom 12 and a sleeve jacket 13. Each piston 9 is sealed directly to the inner wall of the sleeve jacket 13 through a ball-shaped piston head 14. FIG. 2 shows the piston 9 including the piston head 14 on a larger scale.

The sleeve bottoms 12 of the respective cylindrical sleeves 10 are supported by respective barrel plates 15 which are fitted around the shaft 2 by means of respective ball hinges 16 and are coupled to the shaft 2 by means of keys 17. Consequently, the barrel plates 15 rotate together with the shaft 2 under operating conditions. The barrel plates 15 rotate about respective second axes which are angled with respect to the first axis of rotation 4. This means that the cylindrical sleeves 10 also rotate about the respective second axes of rotation. As a consequence, upon rotating the shaft 2 the volumes of the compression chambers 11 change. During rotation of the barrel plates 15 each cylindrical sleeve 10 makes a combined translating and swiveling motion around the cooperating piston 9. Therefore, the outer side of each piston head 14 is ball-shaped. The ball-shape creates a sealing line between the piston 9 and the cylindrical sleeve 10 which extends perpendicularly to the center line of the cooperating cylindrical sleeve 10. The pistons 9 are conical and their outer diameters outside the respective piston heads 14 decrease towards the flange 8 in order to allow the relative motion of the cooperating cylindrical sleeves 10 about the pistons 9.

The sides of the respective barrel plates 15 which are directed away from the flange 8 are supported by respective supporting surfaces of the face plates 7. Due to the inclined orientation of the face plates 7 with respect to the flange 8 the barrel plates 15 pivot about the ball hinges 16 during rotation with the shaft 2. The angle between the first axis of rotation and the respective second axes of rotation is approximately nine degrees in practice, but may be smaller or larger.

The barrel plates 15 are pressed against the respective face plates 7 by means of springs 18 which are mounted in holes in the shaft 2. The compression chambers 11 communicate via a central through-hole in the respective sleeve bottoms 12 with cooperating passages 19 in the barrel plates 15. The passages 19 in the barrel plates 15 communicate via passages in the face plates 7 with a high-pressure port and a low-pressure port in the housing 27.

Figure 3:
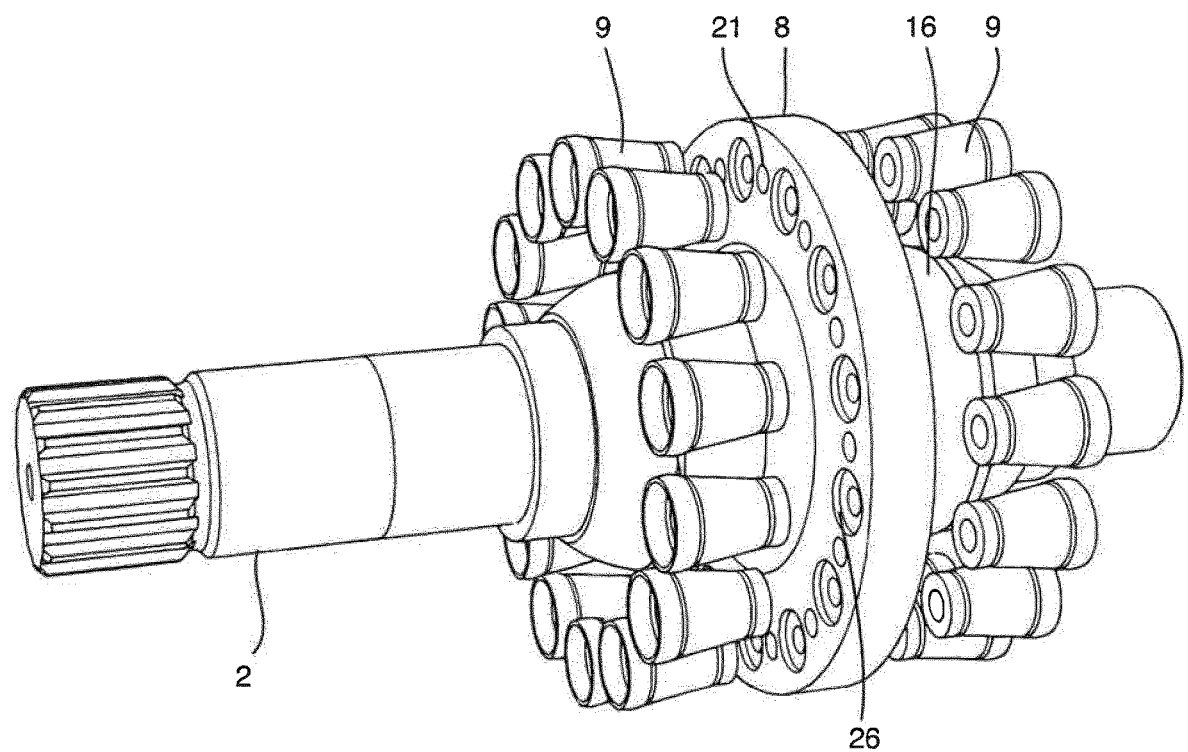
FIG. 3 is a perspective view of the shaft of the embodiment with pistons in non-assembled condition of FIG. 1.

FIG. 1 shows that each piston 9 is fixed to the flange 8 by means of a piston pin 20 which is pressed into a flange hole 21. FIG. 2 shows the press fitting for one piston 9. FIG. 3 shows the shaft 2 including the flange 8 and non-assembled pistons 9, which illustrates that the flange 8 is provided with 28 flange holes 21. The reason for this is that the embodiment as shown in FIG. 1 is designed such that the pistons 9 on either side of the flange 8 alternately move into the top dead center and bottom dead center, which refers to the position where the volume of the compression chambers 11 is at its minimum and maximum, respectively. Consequently, in circumferential direction of the flange 8 adjacent flange holes 21 receive pistons 9 on either side of the flange 8.

FIG. 2 shows that the piston pin 20 has a piston pin head 22 and a piston pin shank 23. The diameter of the piston pin head 22 is larger than that of the piston pin shank 23. The piston pin shank 23 extends through a through-hole along the center line of the piston 9 and an end portion thereof is clamped in the flange hole 21. The piston pin head 22 rests on a bottom of a piston recess inside the piston head 14. The piston head 14 of each piston 9 has a circumferential wall of which the inner side surrounds the piston recess. In assembled condition as shown in FIG. 2 a circumferential outer side of the piston pin head 22 faces the inner side of the circumferential wall of the piston head 14. The circumferential outer side of the piston pin head 22 and the inner side of the circumferential wall of the piston head 14 are parallel and form a slot-shaped cavity 25 between the inner side of the circumferential wall and the outer side of the piston pin head 22. This means that under operating conditions hydraulic fluid can enter the cavity 25 and exert a force onto the circumferential wall of the piston head 14 in order to deform the piston head 14.

Furthermore, FIG. 2 shows that an end portion of the piston 9 remote from the piston head 14 is received in a flange recess 26 such that the piston 9 is locked in lateral direction with respect to the flange 8. There is play between the piston pin shank 23 and the piston 9 in transverse direction of the piston pin 20 beyond the flange 8. FIG. 2 also shows that the piston pin head 22 partly extends beyond the end of the piston head 14 as seen from the flange 8.

Figure 4:
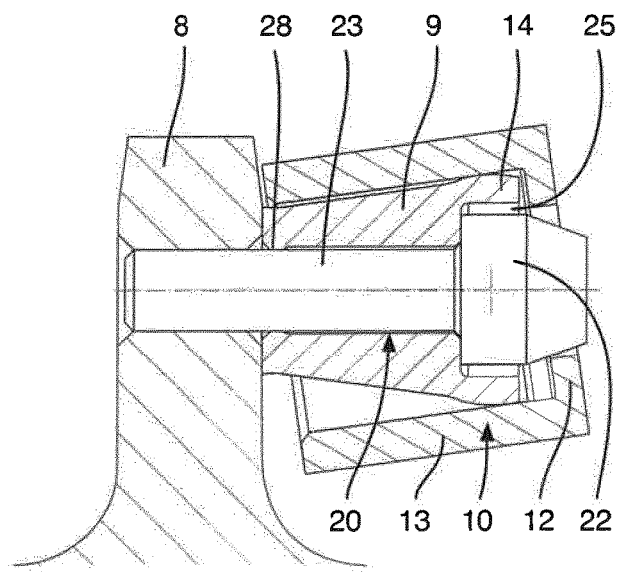
FIG. 4 is a similar view as FIG. 2, but showing an alternative embodiment.

FIG. 4 shows an alternative embodiment in which the piston 9 rests on the flange 8 and is locked to the piston pin shank 23 in transverse direction of the piston pin 20 at a locking location 28. The locking location 28 is close to the flange 8 so as to minimize torque on the piston pin shank 23. There is play between the piston pin 20 and the piston 9 in transverse direction of the piston pin 20 beyond the locking location 28 as seen from the flange 8.

Fixing the pistons 9 to the flange 8 by means of the piston pins 20 as described hereinbefore is a relatively simple way of manufacturing, whereas the desired slot-shaped cavity 25 is easily created by selecting the dimensions of the piston pin head 22 and the piston recess.

The invention is not limited to the embodiments shown in the drawings and described hereinbefore, which may be varied in different manners within the scope of the claims and their technical equivalents.

The invention claimed is:

1. A hydraulic device comprising a housing, a shaft which is mounted in the housing and rotatable about a first axis of rotation, wherein the shaft has a flange extending perpendicularly to the first axis, a plurality of pistons which are fixed to the flange at equiangular distance about the first axis of rotation, a plurality of cylindrical sleeves cooperating with the pistons to form respective compression chambers of variable volume, each cylindrical sleeve having a circumferential cylindrical wall about a linear centerline, wherein the cylindrical sleeves are rotatable about a second axis of rotation which intersects the first axis of rotation by an acute angle such that upon rotating the shaft the volumes of the compression chambers change, wherein each piston has a piston head including a ball-shaped circumferential wall in contact with the circumferential cylindrical wall of the sleeve, wherein each of the pistons is fixed to the flange by a piston pin extending through the piston to the flange and wherein the ball-shaped circumferential wall is fixed immovably with respect to the flange, the piston pin having a piston pin head including a circumferential outer side facing an inner side of the circumferential wall of the piston head, and wherein the piston pin head rests on a bottom of a piston recess inside the piston head.

2. The hydraulic device according to claim 1, wherein the piston pin has a piston pin shank of which an end portion is clamped in the flange.

3. The hydraulic device according to claim 2, wherein the piston is locked to the flange in transverse direction of the piston pin, whereas space is present between the piston pin and the piston in transverse direction of the piston pin beyond the flange.

4. The hydraulic device according to claim 2, wherein the piston is locked to the piston pin in a transverse direction of the piston pin at a locking location close to the flange, whereas space is present between the piston pin and the piston in the transverse direction of the piston pin beyond the locking location as seen from the flange.

5. The hydraulic device according to claim 1, wherein each piston is locked to the flange in a transverse direction of the piston pin, whereas space is present between the piston pin and the piston in a transverse direction of the piston pin beyond the flange.

6. The hydraulic device according to claim 5, wherein the flange is provided with flange recesses in which end portions of the respective pistons are received so as to lock the pistons to the flange in the transverse direction of the piston pins.

7. The hydraulic device according to claim 1, wherein the piston is locked to the piston pin in a transverse direction of the piston pin at a locking location close to the flange, whereas space is present between the piston pin and the piston in the transverse direction of the piston pin beyond the locking location as seen from the flange.

8. The hydraulic device according to claim 1, wherein a slot-shaped cavity is present between the inner side of the circumferential wall and the circumferential outer side of the piston pin head.

9. The hydraulic device according to claim 8, wherein the circumferential outer side of the piston pin head and the inner side of the circumferential wall of the piston head are parallel.

10. The hydraulic device according to claim 1, wherein the piston pin head partly projects from an end of the piston head.

11. The hydraulic device according to claim 1, wherein the circumferential outer side of the piston pin head and the inner side of the circumferential wall of the piston head are spaced apart to form a cavity that fluidly communicates with the compression chamber.

12. The hydraulic device according to claim 11, wherein the cavity and piston head are configured such that fluid entering the cavity from the compression chamber is sufficient to exert a force on the inner side of the circumferential wall to deform the piston head.

13. A hydraulic device comprising a housing, a shaft which is mounted in the housing and rotatable about a first axis of rotation, wherein the shaft has a flange extending perpendicularly to the first axis, a plurality of pistons which are fixed to the flange at equiangular distance about the first axis of rotation, a plurality of cylindrical sleeves cooperating with the pistons to form respective compression chambers of variable volume, wherein the cylindrical sleeves are rotatable about a second axis of rotation which intersects the first axis of rotation by an acute angle such that upon rotating the shaft the volumes of the compression chambers change, wherein each piston has a piston head including a circumferential wall in contact with an inner wall of the sleeve, wherein each of the pistons is fixed to the flange by a piston pin extending through the piston to the flange, the piston pin having a piston pin head including a circumferential outer side facing an inner side of the circumferential wall of the piston head, wherein the circumferential outer side of the piston pin head and the inner side of the circumferential wall of the piston head are spaced apart to form a cavity that fluidly communicates with the compression chamber, and wherein the piston pin head rests on a bottom of a piston recess inside the piston head;
   wherein the cavity and piston head are configured such that fluid entering the cavity from the compression chamber is sufficient to exert a force on the inner side of the circumferential wall; and
   wherein the circumferential wall of the piston head is thin walled such that under operating conditions the circumferential wall is deformed at a sealing line.

* * * * *